T. HULL & N. THOMAS.

Improvement in Machines for Tapping Nuts.

No. 130,502. Patented Aug. 13, 1872.

Witnesses

Inventor:
Thomas Hull
Nicholas Thomas

T. HULL & N. THOMAS.
Improvement in Machines for Tapping Nuts.
No. 130,502. Patented Aug. 13, 1872.
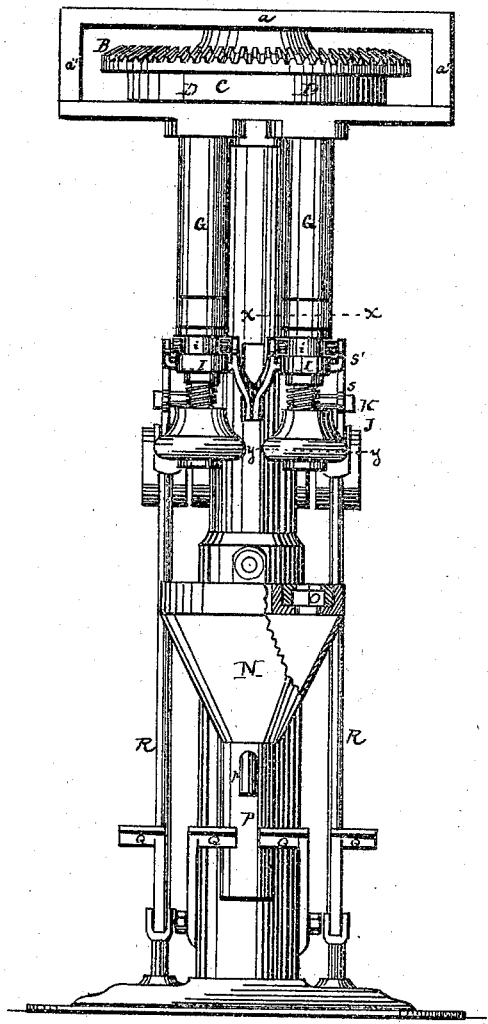
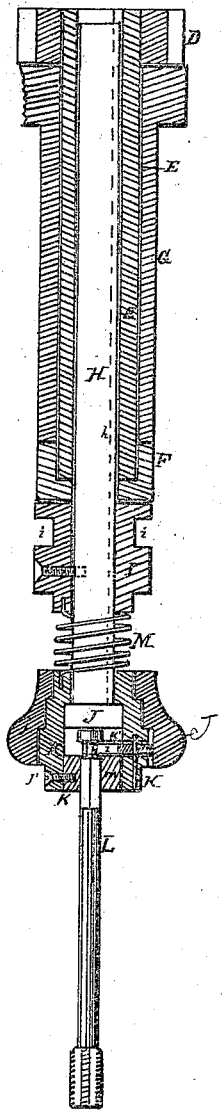
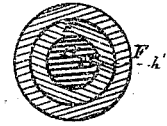
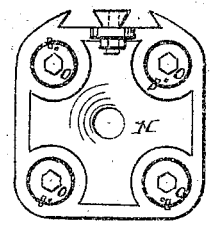
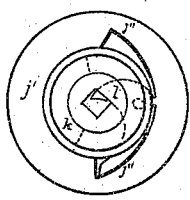

UNITED STATES PATENT OFFICE.

THOMAS HULL AND NICHOLAS THOMAS, OF CHICAGO, ILLINOIS.

IMPROVEMENT IN MACHINES FOR TAPPING NUTS.

Specification forming part of Letters Patent No. 130,502, dated August 13, 1872.

SPECIFICATION.

We, THOMAS HULL and NICHOLAS THOMAS, of Chicago, in the county of Cook and State of Illinois, have invented certain new and useful Improvements in Nut-Tapping Machines, of which the following is a specification, reference being had to the accompanying drawing which forms a part hereof.

Nature and Object of our Invention.

Our invention relates to that class of nut-tapping machines in which a pressure applied to one end of a lever operates to carry the tap, while turning, to the nut, in order that it may be tapped; and our invention consists, first, in a novel construction and arrangement of the driving-gear which revolves the taps, as will be hereafter more fully explained. The second part of our invention relates to that part of a nut-tapping machine which holds the taps; and it consists in a novel construction of the parts forming the chuck or tap-holder, the object of this part of our invention being to enable the tap to be readily and conveniently inserted and locked therein, and unlocked and removed; and our invention also consists in the combination of the nut-holders with weighted levers, operating, in connection with the nut-holders, to release the nuts in the manner stated.

Description of the Drawing.

Fig. 2 is a front elevation of the same, showing a part of the nut-holder in section. Fig. 3 is a top or plan view of the sink, showing the same view of the nut-holders therein. Fig. 4 is a horizontal sectional view through the line $x\ x$ of Fig. 2. Fig. 5 is a view from the bottom, looking upward, of the tap-holding mechanism, inclosed or bounded by the dotted line $y\ y$. Fig. 6 is a vertical central section of one of the shafts and its several parts, including the tap-holding device.

Figure 1:
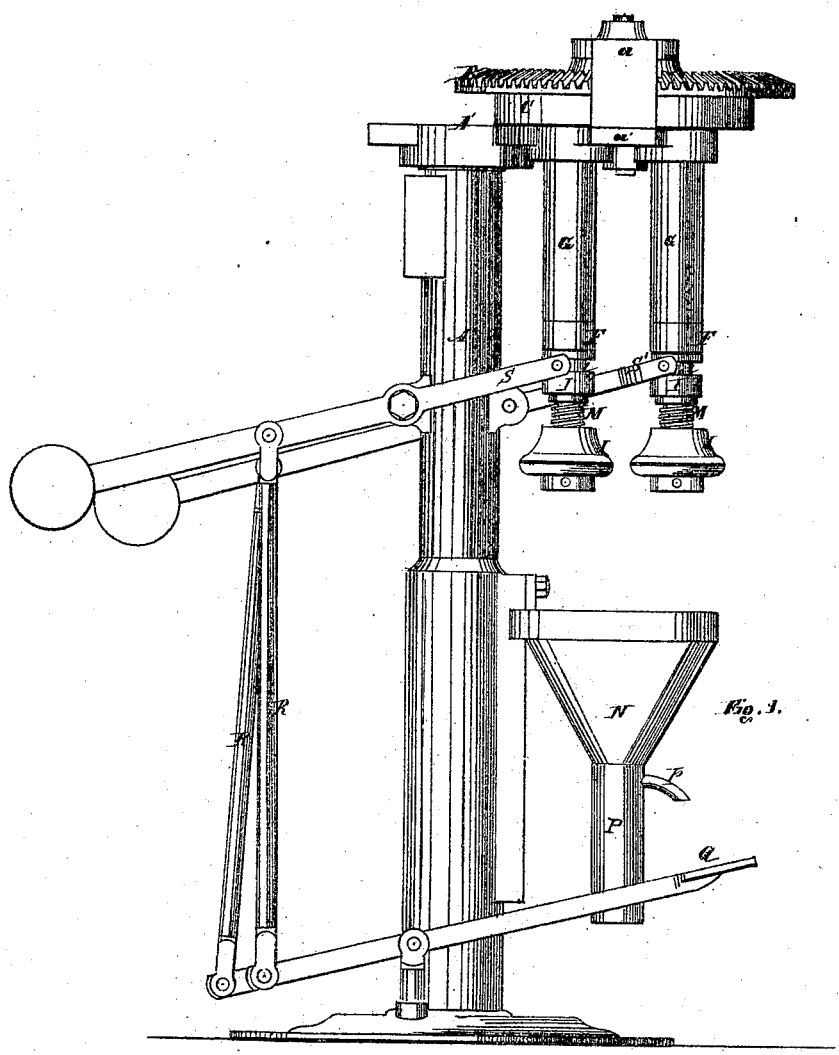
Figure 1 is a side elevation of a nut-tapping machine embodying our improvements.

The Figs. 3, 4, 5, and 6, are upon a larger scale, comparatively, to Figs. 1 and 2.

General Description.

A is the standard of the machine, and A' is a head-piece rigidly attached thereto. B is a horizontal cog-wheel, its arbor having its lower bearing in the head-piece A', and its upper bearing in the cross-piece $a$ of the head-piece A', said cross-piece being supported on the pieces $a'\ a'$. The cogs upon the upper face of the wheel B gear with any suitable or convenient driving gearing. C is a vertical rim or flange upon the lower face of the wheel B, across the inner side of which rim radial cogs extend. D D are spur-wheels, gearing with the cogs of the rim C. E E are hollow shafts, to the upper end of which a spur-wheel, D, is rigidly attached. F is a collar upon the lower end of each of the shafts E E. G G are sleeves or tubular bearings for the shafts E E, which sleeves extend perpendicularly downward from the head-piece A'. The shafts E E are supported by the wheels D D, resting on the head-piece A', or a hub projecting therefrom for that purpose. H H are piston-shafts or chuck-spindles, playing into the shafts E E. $h$ is a longitudinal groove in each of the shafts H H; and $h'$ is a key in each of the shafts E E, fitting into the grooves $h$, and operating as a spline to turn the shafts H H, as the shafts E E are revolved, but allowing a piston movement to the shafts or spindles H H. I is a band rigidly attached to each of the shafts H H by a set-screw, or otherwise, so as to be adjusted thereon, and $i$ is an annular groove sunken into its outer face, as shown. J is a chuck or tap-holder upon the lower end of each of the shafts or spindles H H. $j$ is a cap, forming a part of the chucks, and $j'$ is a collar upon the lower face of the cap, and this collar is cut away in the manner shown, so as to leave a cam, $j''$. K is a broad ring or band, also forming a part of the chucks. This ring K is set upon the lower end of each shaft or spindle H H, so as to leave a chamber in the ring below the ends of the shafts or spindles, and the ring is rigidly attached to the shafts. The cap $j$ rests upon this ring K so that the collar $j'$ surrounds the ring, and so that the said cap may be easily turned. $k$ is a slot through that part of the ring K which is below the end of the shafts or spindles, and $l$ is a dog or lock-bar pivoted therein. This lock-bar has a projection upon its outer edge at each end, and a projection upon its inner edge at the end which enters the chamber of the ring K. M is a spiral spring, having one end attached to the cap $j$ and the other end to the barrel I, as shown.

By turning the cap $j$ the cam $j''$ rides on the outer edge of the lock-bar $l$, and throws the said bar out of the chamber in the ring K; and when the cap $j$ is released, the spiral spring M throws the cap $j$ back again, and the cam $j''$ presses the lock-bar back into the said chamber, and the inner end of this lock-bar is thus made to vibrate into and out of the chamber described. The projections upon the ends of the lock-bar keep the cap $j$ from being turned too far, and thereby becoming misplaced, and the outer end of the lock-bar, by resting against one end of the collar $j'$, as shown in Fig. 5, holds the inner end of the lock-bar within the chamber of the ring K, and also locks the cap $j$ from being further turned by the spring M. It will be observed, by reference to Fig. 5, that the cam $j''$ is also against the projection upon one end of the lock-bar, so as to hold it in the position there shown. $m$ is a block inserted into the lower end of the ring K, but not entirely filling the chamber therein, and it is made rigid therein by means of a set-screw or otherwise. This block $m$ has a rectangular perforation through its face, and L is a tap fitting therein, but so as to be removable. The tap L is provided with a groove running around it near its upper end, so that this groove will pass into the chamber of the ring K, when the tap is inserted into the block $m$. The lock-bar $l$ engages with the groove in the tap as the lock-bar is thus vibrated. When the shafts or spindles H H are revolving the taps may be unlocked by simply applying enough pressure to the cap $j$ to overcome the pressure of the spring M. N is a funnel-shaped box or sink, and O O are nut-holders resting on bed-plates therein. These bed-plates have a perforation through their bottom, as shown. The nut-holders O O are cut to receive the nuts, and so that the nuts will drop freely into them. These nut-holders are cut somewhat deeper than the nuts are thick; and that portion of the nut-holders which is above the nuts when the latter are in place is somewhat smaller than the lower portion, so that a lip is formed above the nuts, as shown in Fig. 2. It will be perceived that if the nuts are twisted or turned around their corners will be brought under this lip, so that they cannot be lifted out of the nut-holders until they are turned back again, it being understood that only a slight turning or twisting movement is allowed by the holder. The holders are securely attached to the bed-plates, or kept from twisting or turning therein, by means of the lock-bars $o o$. P is a removable bottom fitted to the bottom of the box or sink N, and $p$ is a faucet inserted therein. When this bottom-piece P becomes fitted with cuttings from the nuts, it may be removed and emptied, or water may be drawn from the faucet. The sink N is filled with water so that it will reach the taps and nuts and facilitate the operation of tapping and prevent too great frictional heat; or, if it is not desirable or convenient to keep the sink filled with water, it nevertheless furnishes a convenient receptacle for water for the purpose mentioned. This sink N is adjustable upon the standard A, and may be fixed thereon at a greater or less distance from the taps, as may be necessary or desirable. Q Q are treadle-levers pivoted to the standard A, in the manner shown; or they may be pivoted thereto in any suitable manner. S S' are forked levers, the levers S' passing through the standard and being pivoted thereto, and the levers S S having pivoted bearings on rods extending therefrom, as shown; but these levers S S' may be pivoted to the standard in any suitable manner. The rear ends of the levers S S' are weighted and their forked ends have pivotal projections resting in the slots $k$. R R are connecting-rods connecting the treadles with the levers S S', as shown.

The driving-gear being put in motion, the foot is placed on the treadles and the taps are brought down to engage with the nuts. The twisting pressure of the taps in the nuts turns the corners of the nuts beneath the lips described, and the foot may then be removed from the treadles, as the taps will be drawn down, (after having fairly engaged with the nuts,) by the operation of the turning screw-thread against the nuts until the threaded part of the taps pass through the nuts, the perforation of the bottom of the nut-holders or bed-plates admitting of such passage, the twisting-pressure upon the nuts having ceased, by reason of the thread of the taps no longer operating; but the revolution of the taps continuing, the nuts will release themselves from under the lip formed in the manner described, and the weighted levers S S' will draw up the taps with the nuts upon them.

The nuts are thus provided with a female-screw thread; and when the taps become crowded with nuts the taps may be taken from the chucks or tap-holders in the manner described and the nuts removed.

Claims.

Having described the nature and object, construction and operation, of our invention, what we claim, and desire to secure by Letters Patent, is—

1. The construction and arrangement, in a nut-tapping machine, of the horizontal bevel-wheel B provided with vertically-descending, internally-geared flange C, inclosing and engaging the spur-wheels D, to which the shafts E and spindles H for holding the taps are connected, the whole being supported and geared by the plate A, substantially as specified.

2. The combination of the cap $j$, the ring or band K, and dog or lock-bar $l$, when constructed and operating substantially as and for the purposes described.

3. The combination of the nut-holders O O, provided with lips, as described, the taps L and their holding and revolving mechanisms, and the weighted levers S S' for holding and releasing the nuts when constructed and operating substantially as described.

THOMAS HULL.
NICHOLAS THOMAS.

Witnesses:
FRANCIS F. WARNER,
HEINR. F. BRUNS.